United States Patent
Bertz et al.

(10) Patent No.: US 11,892,984 B2
(45) Date of Patent: *Feb. 6, 2024

(54) METHOD OF BUILDING AND SEARCHING A MULTI-DIMENSIONAL CROSS-LINKED DISTRIBUTED LEDGER

(71) Applicant: T-Mobile Innovations LLC, Overland Park, KS (US)

(72) Inventors: Lyle T. Bertz, Lee's Summit, MO (US); Ronald R. Marquardt, Woodinville, WA (US); Lyle W. Paczkowski, Mission Hills, KS (US)

(73) Assignee: T-Mobile Innovations LLC, Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/973,522

(22) Filed: Oct. 25, 2022

(65) Prior Publication Data

US 2023/0050597 A1 Feb. 16, 2023

Related U.S. Application Data

(63) Continuation of application No. 17/140,991, filed on Jan. 4, 2021, now Pat. No. 11,531,649.

(51) Int. Cl.
*G06F 16/00* (2019.01)
*G06F 16/182* (2019.01)
*H04L 9/32* (2006.01)
*H04W 76/11* (2018.01)
*H04L 9/00* (2022.01)

(52) U.S. Cl.
CPC ........ *G06F 16/1824* (2019.01); *H04L 9/3239* (2013.01); *H04W 76/11* (2018.02); *H04L 9/50* (2022.05)

(58) Field of Classification Search
None
See application file for complete search history.

(56) References Cited

U.S. PATENT DOCUMENTS

| 10,924,280 B1 | 2/2021 | Bales et al. |
| 11,531,649 B1 | 12/2022 | Bertz et al. |

(Continued)

OTHER PUBLICATIONS

Notice of Allowance dated Aug. 22, 2022 U.S. Appl. No. 17/140,991, filed Jan. 4, 2021.

*Primary Examiner* — Hasanul Mobin (57) ABSTRACT

A method for creating a link between hyperledger blocks by a block link server. The method comprises receiving by a block link server executing on a computer system a first link creation message from a first network element, the first link creation message comprising first block information comprising a first hyperledger identifier and a first block identifier, both associated with a first hyperledger, receiving by the block link server a second link creation message, comprising second block information comprising a second hyperledger identifier and a second block identifier, both associated with a second hyperledger, storing by the block link server a link data structure comprising the first block information and the second block information, and sending by the block link server a link identifier of the link data structure to the first network element.

19 Claims, 8 Drawing Sheets

(56) References Cited

U.S. PATENT DOCUMENTS

| | | | |
|---|---|---|---|
| 2004/0210479 A1* | 10/2004 | Perkowski | G07F 17/16 |
| | | | 705/14.51 |
| 2017/0243193 A1 | 8/2017 | Manian et al. | |
| 2017/0346880 A1* | 11/2017 | Gay | H04L 65/1069 |
| 2018/0255090 A1* | 9/2018 | Kozloski | H04L 67/535 |
| 2019/0103192 A1* | 4/2019 | Bent | H04L 9/3239 |
| 2019/0190719 A1 | 6/2019 | van de Ruit et al. | |
| 2019/0236298 A1* | 8/2019 | Agarwal | H04L 9/3239 |
| 2019/0245680 A1* | 8/2019 | Boutaba | H04L 9/006 |
| 2019/0340623 A1 | 11/2019 | Rivkind et al. | |
| 2019/0361869 A1 | 11/2019 | Krabbenhoft et al. | |
| 2020/0099530 A1* | 3/2020 | Khatib | G06N 20/00 |
| 2020/0134578 A1 | 4/2020 | Shi et al. | |
| 2020/0143300 A1* | 5/2020 | Weldemariam | G06F 16/1805 |
| 2020/0164886 A1 | 5/2020 | Dutta et al. | |
| 2020/0175003 A1 | 6/2020 | Jiang et al. | |
| 2020/0210413 A1 | 7/2020 | Quick et al. | |
| 2020/0233950 A1 | 7/2020 | Assenmacher et al. | |
| 2020/0266989 A1 | 8/2020 | Krcmaricic-Barackov et al. | |
| 2020/0366489 A1 | 11/2020 | Assenmacher | |
| 2021/0157954 A1* | 5/2021 | Majko-Ruben | H04L 9/3239 |
| 2021/0218710 A1* | 7/2021 | Fallah | H04L 9/14 |
| 2022/0004647 A1 | 1/2022 | Casella et al. | |

\* cited by examiner

METHOD OF BUILDING AND SEARCHING A MULTI-DIMENSIONAL CROSS-LINKED DISTRIBUTED LEDGER

CROSS-REFERENCE TO RELATED APPLICATIONS

This application is a continuation of and claims priority under 35 U.S.C. § 120 to U.S. patent application Ser. No. 17/140,991 filed on Jan. 4, 2021, entitled "Method of Building and Searching a Multi-dimensional Cross-linked Distributed Ledger," by Lyle T. Bertz, et al., which is incorporated herein by reference in its entirety for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A blockchain is a data structure that comprises a plurality of blocks that are linked in a sequence with each other. Each block in the blockchain comprises a data field, a hash of a previous block in the blockchain (except for the first block in the blockchain), a nonce value, and a hash of the block itself calculated over its data content, the hash of the previous block, and its nonce. A blockchain may be used in an implementation of a Hyperledger or other distributed ledger system.

Network slices provide a dedicated communication network for use by a user, such as an enterprise, organization, or individual, where the dedicated communication network may be delivered as a virtual resource to the user. From the point of view of the user, the network slice may behave as if it were a separate network infrastructure, but the network slice may be delivered by virtualized computing resources provided by a common physical communication and computing infrastructure. In some networks, including 5G networks, one or more network slices may be hosted by a computer system or server of the network.

SUMMARY

In an embodiment, method for creating a link between hyperledger blocks by a block link server is disclosed. The method comprises receiving by a block link server executing on a computer system a first link creation message from a first network element, the first link creation message comprising first block information comprising a first hyperledger identifier and a first block identifier, both associated with a first hyperledger, receiving by the block link server a second link creation message, comprising second block information comprising a second hyperledger identifier and a second block identifier, both associated with a second hyperledger, storing by the block link server a link data structure comprising the first block information and the second block information, and sending by the block link server a link identifier of the link data structure to the first network element.

In another embodiment, a method for creating a link between hyperledger blocks by a first network element. The method comprises sending by a network element executing on a computer system a request to a hyperledger server to create a first block, receiving by the network element from the hyperledger server first block information comprising a first hyperledger identifier and a first block identifier of the first block, both associated with a first hyperledger, requesting by the network element from a second network element second block information comprising a second hyperledger identifier and a second block identifier, both associated with a second hyperledger, sending by the network element a link creation message to a block link server to create a link between hyperledger blocks, the link creation message comprising the first block information and the second block information, receiving by the network element from the block link server a link identifier of a link data structure, and sending by the network element a request to the hyperledger server to add the link identifier to the first block.

In yet another embodiment, a method for finding link data structures associated with a link search identifier by a block link server is disclosed. The method comprises receiving by a block link server executing on a computer system a link search identifier, and adding by the block link server to a set of link data structures all link data structures comprising the link search identifier.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In 5G, new services may shift attention from billing by minutes of use to billing by events. In embodiments of the disclosure, such event billing could be accomplished by linking blocks from block chains (or hyperledgers), in one analogy, into a fabric of block chains—with the weft associated with subscriber devices (mobile phones, laptops, wearable computers, IoT devices) and the woof associated with network elements (routers, gateways, network functions, network slices). The term "fabric" is not used here to refer to a Hyperledger Fabric, but in a more general sense. To generalize beyond the analogy of a fabric, a multidimensional block chain structure is contemplated that may have 2-dimensions (like the fabric), 3-dimensions, or N-dimensions.

Such a linking structure would support selecting one member of a dimension (continuing the analogy from above, for example, a subscriber device or network element) and traversing a sequence of block chain links associated with that member. For example, a billing service could traverse a block chain associated with an IoT device to determine all events (billable events) in a contiguous range (a date range) to determine a monthly bill. Alternatively, a block chain associated with a router could be traversed to determine all services provided by that router—across multiple different, unassociated devices. If there were a third dimension, members associated with the third dimension would each be associated with their own block chain that could be traversed in like fashion. Additional dimensions might be associated with different network slices and/or different contracts/billing plans.

Said in other words, linking structures according to the disclosure support random access that is 2-way for a 2-dimension structure, 3-way for a 3-dimension structure, and N-way for an N-dimension structure. Such structures support efficient and optimal access to the data that is stored therein, which is distinct from relational database structures.

Without linking structures according to the disclosure, billing a customer for resources actually used, rather than requiring a customer to reserve and pay for blocks of resources it might not actually use, can require searching hyperledgers associated with the customer's subscriber devices and hyperledgers associated with network elements that may have provided billable services to the customer. Candidate blocks from the hyperledgers would then be analyzed to determine whether they related to billable events or other communications and whether they occurred during a billing period of interest. Such billing processes would be slow and/or resource intensive to the point of being impractical to use, while linking structures according to the disclosure provide a more time and resource efficient way to find billable events. This provides a first technical solution to a first technical problem.

Additionally, linking structures according to the disclosure, are created at the time a billing event occurs, identifying and linking blocks and hyperledgers of subscriber devices and network elements at the time such services are provided. Such linking structures are created for events that are known to be (or are likely to be) billable events, making the processing required for their creation (e.g., writing new blocks or elements to the linking structure) an efficient process. This provides a second technical solution to a second technical problem.

Thus, the use of linking structures according to the disclosure makes identification of events for billing much faster, less resource intensive, and practical to use for identifying billable events at the time they occur and finding information about them when such information is needed. In this way, linking structures according to the disclosure provide a technical solution to a technical problem.

A similar technical problem arises when a health authority attempts to perform contact tracing based on locations of a target user's network device. A search through the user's hyperledger to determine when the device had been connected to public access devices might also reveal information about the device's connections to other, private devices. In contrast, a search of linking structures according to the disclosure for links including the target user's network device would find public connections, such as connections made under contract or connections to fixed position public access WiFi access point network devices. The linking structures could then be searched for links that include the access point network element identifier and other UE network element identifiers that connected through the access point network device at the same time that the target network element was connected to the access point network device.

Linking structures according to the disclosure may be created on request of a network element based on hyperledger block identifying information received from the requesting element and from a second network element. One of the network elements may assign an event identifier to be stored in the link, where the event identifier helps the network element identify a contract or circumstance under which the link was created, or a reason for creating the link. The network elements may store an identifier of the link data structure in the blocks linked by the structure. A collection of such linking structures may be easily searched by an event identifier, a network element identifier, or a pair of first and second network element identifiers.

Figure 1:
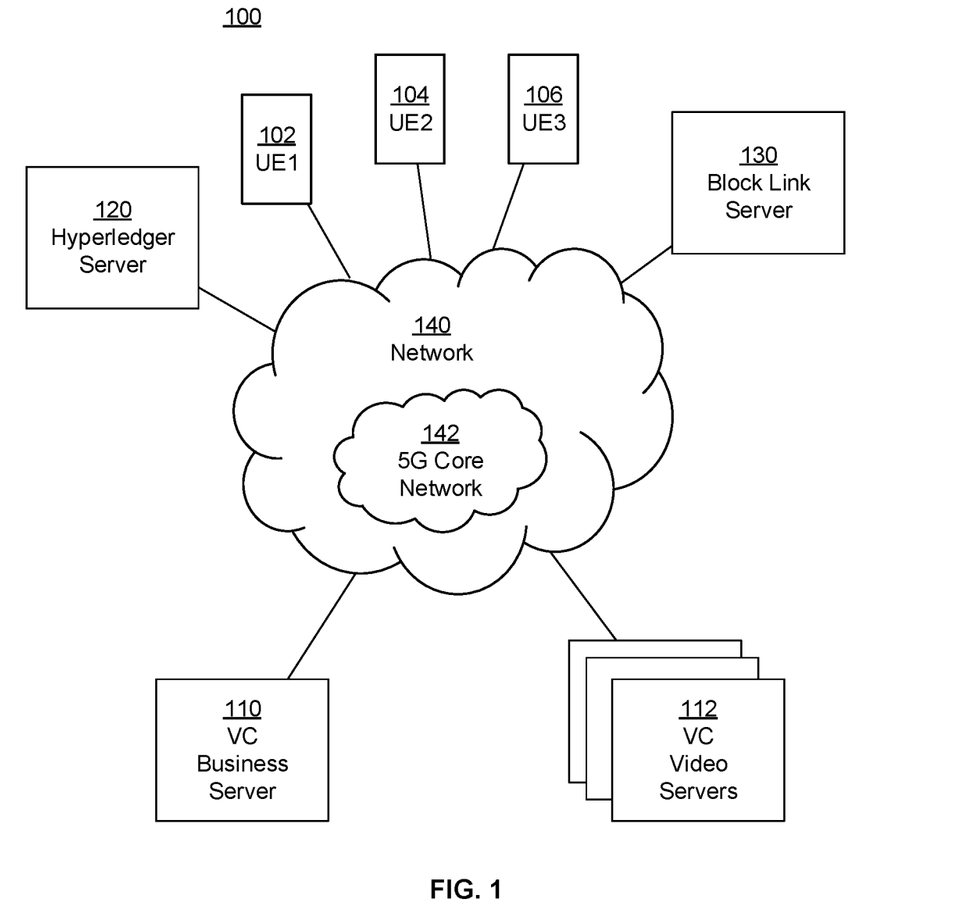
FIG. 1 is a block diagram of a communication system according to an embodiment of the disclosure.

Turning now to FIG. 1, a system 100 is described. In an embodiment, the system 100 comprises User Equipment (UE) 102, 104, and 106, a video conference business server 110, one or more video conference video servers 112, a hyperledger server 120, and a block link server 130, communicating wired or wirelessly via a network 140. The UE 102 is a handheld device, such as a smart phone or tablet and the UE 104 is a laptop computer, both communicating wirelessly with the network 140. The UE 106 is a desktop computer, using wired communication with the network 140. The network 140 may comprise or be coupled to a 5G core network 142, as described in greater detail with reference to FIG. 7.

The network 140 uses the term "network" in a generic sense and may include elements from more than one wired or wireless service provider. For example, the UE 102 may be coupled to the network 140 via a first service provider, while the block link server 130 is coupled via a second service provider. Any of the elements of system 100 may be coupled to other elements via the 5G core network 142. Where the network 140 comprises elements from multiple service providers, the network 140 may include a plurality of 5G core networks 142, each supported by a different service provider and coupled to each other directly or via connections through non-5G elements of the network 140.

The laptop UE 104 sends a request to the video conference business server 110 to set up a multi-participant video conference call and receives from the video conference business server 110 video conference setup information to be used by participants to join the video conference. The UE 104 provides the video conference setup information to the UEs 102 and 106 to permit them to participate in the video conference.

The video conference business server 110 and the video conference video servers 112 are owned by a video conference service provider. Each of the UEs 102, 104, and 106 are associated with a company that has contracted with the video conference service provider for a desired Quality of Service (QoS) for the company's video conferences. To provide this QoS, the video conference service provider has contracted for a 5G slice to carry the company's video conferences. The 5G slice is managed by network functions in the 5G core network 142. When the UEs 102, 104, and 106 use the video conference setup information to join the video conference, they are connected via the 5G slice to one of the video conference video servers 112 to participate in the video conference.

Each of the UEs 102, 104, and 106, the video conference business server 110, one or more video conference video servers 112 is a network element, and uses the hyperledger server 120 to maintain an individual network element hyperledger that comprises blocks recording, among other things, communications between the network element and other network elements. In an embodiment, the creation of blocks in the hyperledgers is done in such a way as to enhance the security of the data content of the blocks and to promote confidence that the data content is accurate and not corrupted. For example, the hyperledger server 120 may request a trusted third party to generate a digital notary component (e.g., a token, a tag, or certificate) based on the content of a birth block of the hyperledger (a first block comprising information about the hyperledger identity and purpose and possibly chain code that provides executable logic associated with the blocks of the hyperledger) when initiating the hyperledger, and the hyperledger server 120 may add this to the birth block. This same digital notary component may be added to subsequent blocks of the hyperledger. For more details on use of a digital notary component see U.S. patent application Ser. No. 16/384,872, filed Apr. 15, 2019, titled "Digital Notary Use in Distributed Ledger Technology (DLT) for Block Construction and Verification," by Mark R. Bales, et al., which is incorporated by reference herein in its entirety.

The network elements of the various embodiments herein include, but are not limited to, network devices, servers, network functions, and network applications. That is, a network element is any element of the system 100 that may interact with another network element in an event that is memorialized by both network elements in hyperledger blocks between which the elements choose to create a link.

In the scenario described above, when the video conference business server 110 sends the video conference setup information to the UE 104, both network elements add blocks recording the communication to their respective network element hyperledgers. When each of the UEs 102, 104, and 106 independently uses the video conference setup information to connect to the designated video conference video server 112, the UE adds a block recording its connection to its respective network element hyperledger and the video conference video server 112 adds a block recording the connection to its network element hyperledger. When the video conference ends and the UEs 102, 104, and 106 disconnect from the video conference video server 112, each of the network elements adds a block recording the end of the connection to its respective network element hyperledger.

Each of these communications may be considered as an event that involves two network elements. A system according to the disclosure provides improved billing, bandwidth management, and network infrastructure management by providing the block link server 130 to create links between two or more blocks created by network elements created as part of an event.

In one example, when the UE 104 sends the request to the video conference business server 110 to set up the video conference call and the video conference business server 110 sends video conference setup information to the UE 104, the block link server 130 is used to create a link between the hyperledger block created by the UE 104 to record the request it sent and the block created by the video conference business server 110 when it sends the video conference setup information in response.

As discussed in further detail below, the link comprises a link data structure that includes a link identifier of the link data structure and hyperledger IDs and block IDs of two or more hyperledger blocks between which it creates a link. The block link server 130 may store its link data structures in a hyperledger in the hyperledger server 120 or other hyperledger storage function. In other embodiments, the link data structures may be stored in a simple linked list or other data storage structure. In some embodiments, the block link server 130 uses the hyperledger IDs and block IDs of the hyperledger blocks that it is linking to obtain copies of the blocks to be stored in the link data structure.

In another example, when the UE 102 uses the video conference setup information to connect to one of the video conference video servers 112 to participate in the video conference, the block link server 130 is used to create a link between hyperledger blocks created by the UE 102, the video conference video server 112, and a network function in the 5G core network 142.

In some embodiments of the disclosure, the video conference business server 110 includes in the video conference setup information an event identifier. One or both of the UE 104 and the video conference business server 110 include the event identifier in the information they send to the block link server 130 when creating the link between their respective blocks. Each of the UEs 102 and 106 receive the event identifier as part of the video conference setup information received from the UE 104. When each of the UEs 102, 104, and 106 sets up its connection to one of the video conference video servers 112, it sends the event identifier to the video conference video server 112, and one or both of the network elements include the event identifier in the information they send to the block link server 130 when creating the link between their respective blocks. In such embodiments, the event identifier is also included in links formed between hyperledger blocks that are recorded when the video conference server connections are torn down, signaling an end to the video conference.

As seen in this example, in some embodiments, the event identifier is a multi-link value, used to identify multiple links between blocks, all of which represent communications related to a single transaction. In the example above, the single transaction is the requesting and conducting of the multi-attendee video conference.

In other embodiments, the event identifier is a single-link value, used only for the period required for the two or more network elements to communicate with the block link server 130 to create a single link between their respective hyperledger blocks. Note that where one of the two or more network elements is an Internet of Things (IoT) server, this period may last hours or days from the creation of the link until the IoT server receives data from one or more of its IoT devices to cause it to create its block.

In some such embodiments, the event identifier is a unique identifier assigned by—and obtained by the network elements from—the block link server 130 in order to allow a link searcher to uniquely identify the links related to the single transaction among all the other links stored by the block link server 130. In other embodiments, the event identifier may be obtained from another source, and the combination of the event identifier and an identifier of a network element associated with the link (for example, a network element identifier or hyperledger identifier) may be used to allow a link searcher to uniquely identify a desired link. Suitable network element identifiers include, but are not limited to, a media access control (MAC) address and an Internet Protocol (IP) address.

In some embodiments, a link is created by the block link server 130 in the following way. A first network element (for example, the UE 104) receives from a second network element (for example, the video conference business server 110) block information relating to the hyperledger block created for the second network element as part of an event. The first network element then sends to the block link server 130 block information relating to its own hyperledger block created as part of the event, as well as the block information received from the second network element. After creating a link between the two blocks, the block link server 130 returns to the first network element a link identifier of a link data structure linking the two blocks. The first network element may include the link identifier in its block related to the event. In some such embodiments, the first network element further includes in its block a network element identifier of the second network element. In some embodiments, the first network element sends the link identifier to the second network element. In other embodiments, the block link server 130 sends the link identifier to the second network element.

In other embodiments, the first and second network elements reach consensus on an event identifier for an event relating to the link being created and independently send their block information and the event identifier to the block link server 130. Once at least two sets of block information associated with the same event identifier have been received, the block link server 130 creates a link between the at least two blocks and returns the link identifier independently to the first and second network elements. At a later time, a third network element may send block information and the same event identifier to the block link server 130. In response, the block link server 130 adds the third block to the link data structure linking the first two blocks associated with the event identifier and sends the link identifier to the third network element.

Adding a third block to the link data structure forms a three-dimensional link between blocks. In other embodiments, additional blocks may be added to the link data structure to form n-dimensional links that link n blocks.

In some embodiments, the block information sent to the block link server 130 by the network elements include a hyperledger identifier and a first block identifier that, together, permit the block link server 130 or other network element to access to the identified block via the hyperledger server 120. Such embodiments may be characterized as linking blocks by storing pointers or other references to the blocks such as a block number, a block hash, or a Transaction ID. An example of a hyperledger identifier for a hyperledger that is implemented by a blockchain would be a node address of a genesis node of the blockchain, for example, chain1@12.34.56.78:4321. In contrast, in other embodiments, the block information sent to the block link server 130 by the network elements may include actual copies of the blocks, allowing the blocks in a link to be analyzed without requiring network traffic to the hyperledger server 120.

The block link server 130 can provide a system with improved billing by allowing a network provider, for example, to bill the company associated with UEs 102, 104, and 106 for a number of video calls actually conducted in a month or for a number of video conference attendee-minutes actually used in a month, rather than fixed fee billing for a contracted number of calls or attendee-minutes, whether used or not. In the present example, one step in such a billing process is to search links in the block link server 130 for links between blocks of the video conference video servers 112 and blocks of the UEs 102, 104, and 106. In some embodiments, such a search can be expanded to all communications related to the company by obtaining event identifiers or additional network element identifiers from the links found in the first step and searching the block link server 130 for other links including those event identifiers.

The block link server 130 may provide a system with improved bandwidth management by allowing an owner of the video conference video servers 112, for example, to search in the block link server 130 for all links that include blocks of the video conference video servers 112. Such blocks can then be examined to determine a frequency and/or number of video conference connections that were established, or an aggregate amount of time during which video conference connections were in use.

The block link server 130 can provide a system with improved network infrastructure management by enabling a network provider, for example, to search in the block link server 130 for all links that include blocks of the video conference slice network function in the 5G core network 142. Such blocks can then be examined to determine whether an appropriate number of routers and other network assets have been allocated to the video conference slice.

In some embodiments, searching links in the block link server 130 produces an unordered set of links matching the search criteria. For some analyses, the set of links may then be sorted by a time order, for example, by time of creation or modification. In some embodiments, the search criteria may include a starting time criterion and/or an ending time criterion. A time criterion may include calendar dates, days of the week, and/or times of day.

While the hyperledger server 120 and the block link server 130 are shown in FIG. 1 as single network elements, it will be understood that any or all of these functions may be performed by a cluster of network-connected devices or provided in a decentralized manner by a network of geographically separated network elements utilizing a consensus algorithm to ensure consistency of hyperledger copies.

Figure 2:
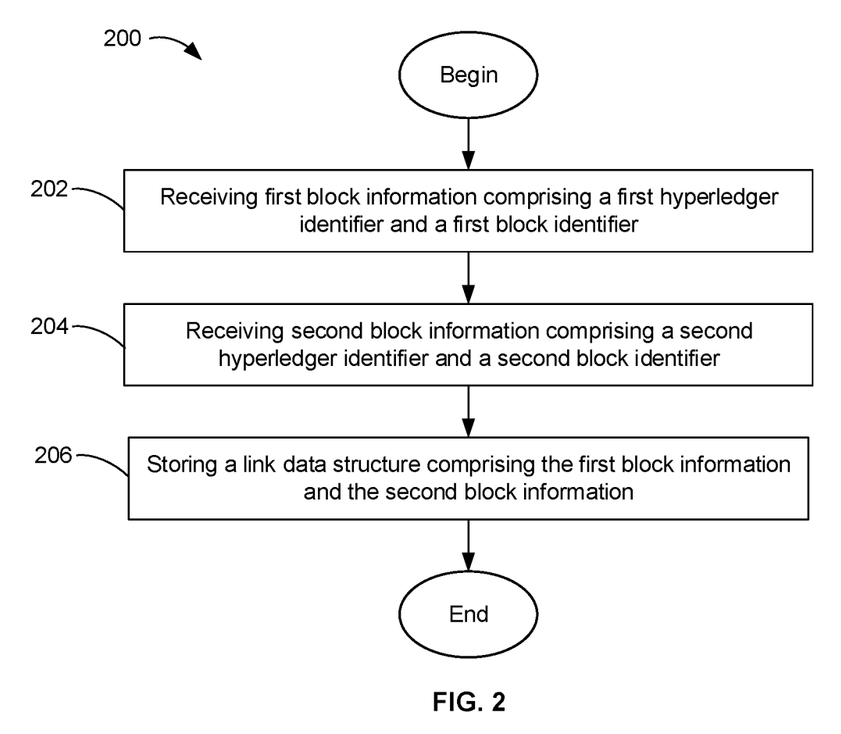
FIG. 2 is a flow chart of a method according to an embodiment of the disclosure.

FIG. 2 is a flow chart of a method 200 according to an embodiment of the disclosure. In an embodiment, the method 200 is a method for creating a link between hyperledger blocks by the block link server 130. At step 202, the block link server 130 receives first block information comprising an identifier of a first hyperledger and an identifier of a first block in the first hyperledger. In some embodiments, the first block information further comprises an identifier of an associated first network element.

At step 204, the block link server 130 receives second block information. Similar to the first block information, the second block information comprises an identifier of a second hyperledger and an identifier of a second block in the second hyperledger, and may also comprise an identifier of an associated second network element. The first block information and second block information may be received from a single network element. In embodiments where the first and second block information include identifiers of respective associated first and second network elements, the method 200 may further comprise sending a link identifier that identifies the link data structure to the first and second network elements.

At step 206, the block link server 130 creates a link between the first and second blocks by storing a link data structure comprising the first block information and second block information. In some embodiments, the method 200 further comprises the block link server 130 receiving an event identifier and storing the event identifier in the link data structure.

In other embodiments, the method 200 further comprises the block link server 130, after storing the link data structure, receiving third block information comprising an identifier of a third hyperledger and an identifier of a third block in the third hyperledger. In such embodiments, the block link server 130 creates a link between the first, second, and third blocks by adding the third block information to the link data structure. In some such embodiments, the third block information includes a link identifier that identifies the link data structure.

In still other embodiments, the method 200 further comprises the block link server 130, prior to storing the link data structure, receiving fourth block information comprising an identifier of a fourth hyperledger and an identifier of a fourth block in the fourth hyperledger. In such embodiments, in step 206 the block link server 130 creates a link between the first, second, and fourth blocks by storing a link data structure comprising the first block information, second block information, and fourth block information. In embodiments where the fourth block information includes an identifier of a fourth network element, the method 200 may further comprise sending the link identifier that identifies the link data structure to the fourth network element.

Figure 3A:
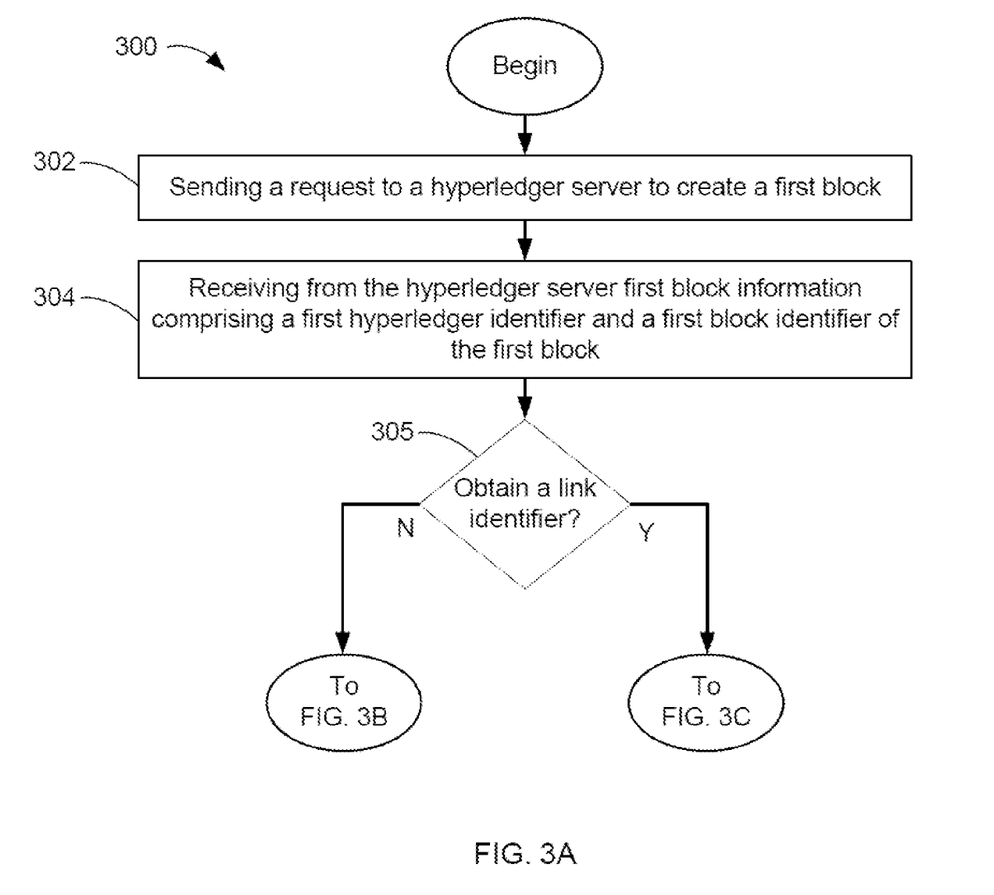
FIGS. 3A-3C are a flow chart of another method according to an embodiment of the disclosure.
Figure 3B:
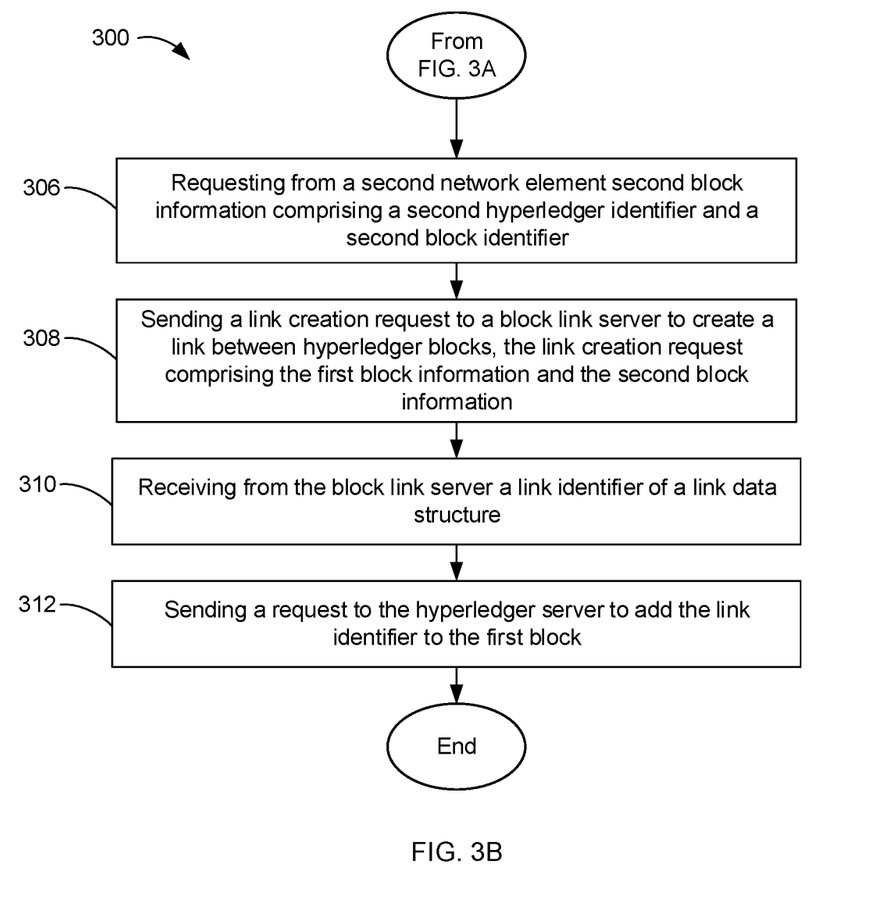
Figure 3C:
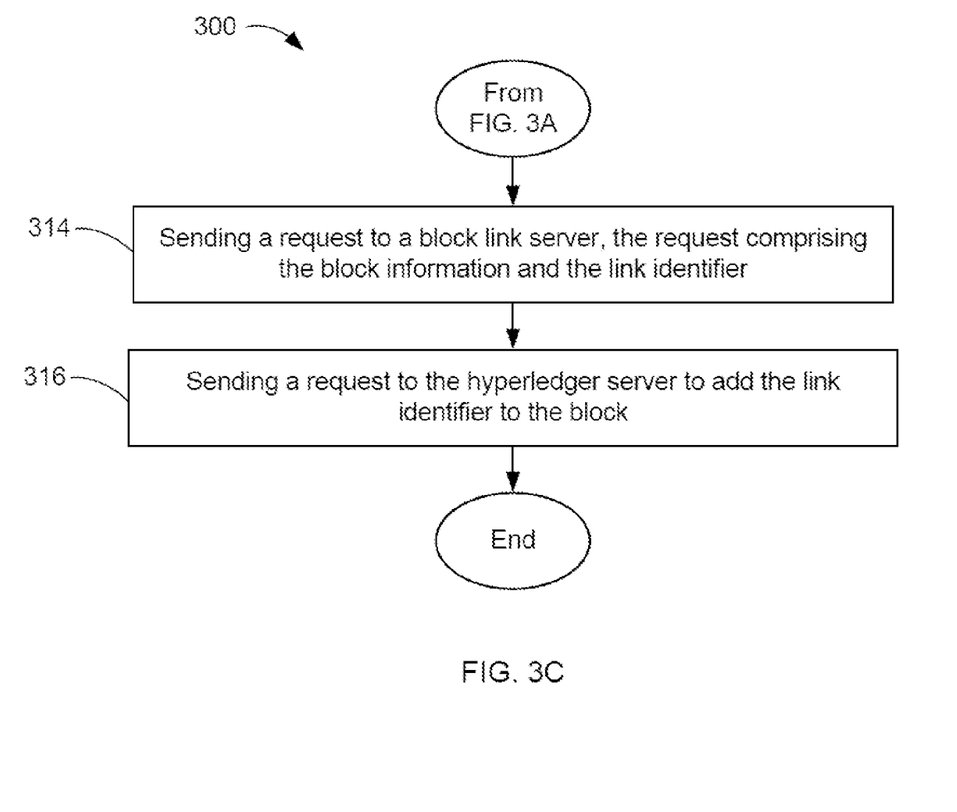

FIGS. 3A-3C are a flow chart of a method 300 according to an embodiment of the disclosure. In an embodiment, the steps of the method 300 shown in FIGS. 3A and 3B are steps for creating a link between hyperledger blocks by a network element (for example, the laptop UE 104). The steps of the method 300 shown in FIGS. 3A and 3C are steps for adding a hyperledger block to a link data structure by a network element (for example, the network element executing the video conference slice network function in the 5G core network 142). In some embodiments, a network element may implement only the steps of the method 300 shown in FIGS. 3A and 3C, and not those shown in FIG. 3B (for example, an IoT server that adds its block at a later time to a link created by other network elements. In other embodiments, though, an IoT server may implement all steps of the method 300.

At step 302, the network element sends a request to the hyperledger server 120 to create a first hyperledger block. At step 304, the network element receives from the hyperledger server 120 first block information that includes a first hyperledger identifier and a first block identifier of the first block. At step 305, the network element determines whether a link identifier has been obtained.

For example, consider a scenario where the video conference video server 112 has just received video conference setup information from, for example, the UE 106 and has created a link between blocks of itself and the UE 106, using the method 300 of FIGS. 3A and 3C. In such a scenario, the network element executing the video conference slice network function in the 5G core network 142 may obtain from the video conference video server 112 the link identifier received from the block link server 130, so that the network element executing the video conference slice network function can add its block as a third block linked by the link data structure. In other embodiments, as other UEs connect to the same video conference, the video conference video server 112 may request the block link server 130 to add the blocks from the additional UEs to the link created between blocks from the video conference video server 112, the UE 106, and the network element executing the video conference slice network function. In this way, the link data structure may be used to form an n-dimensional link between n blocks.

If it is determined in step 305 that a link identifier has not been obtained, the method continues at step 306, shown in FIG. 3B. If a link identifier has been obtained, the method continues at step 314, shown in FIG. 3C.

Turning to FIG. 3B, at step 306, the network element requests from a second network element (for example, the video conference business server 110) second block information that includes a second hyperledger identifier and a second block identifier. At step 308, the network element sends a link creation message to the block link server 130 to create a link between hyperledger blocks identified by the first and second block identifiers. The link creation message includes the first block information and the second block information and, in some embodiments, also incudes identifiers of the network element and the video conference business server 110. In some embodiments, the method 300 further includes the network element receiving an event identifier from the video conference business server 110 and including the event identifier in the link creation message.

At step 310, the network element receives from the block link server 130 a link identifier of a link data structure created by the block link server 130 linking the hyperledger blocks identified by the first and second block identifiers. At step 312, the network element requests the hyperledger server 120 to add the link identifier to the data stored in the hyperledger block identified in the first block information.

In some embodiments, the network element also sends the link identifier to the video conference business server 110. In embodiments where the link creation request includes the identifier of the video conference business server 110, the block link server 130 may send the link identifier to the video conference business server 110.

Turning to FIG. 3C, at step 314, the network element sends a link expansion message to the block link server 130, the link expansion message comprising the first block information from step 304 and the link identifier from step 305. At step 316, the network element sends a request to the hyperledger server 120 to add the link identifier to the block created in step 302.

Figure 4:
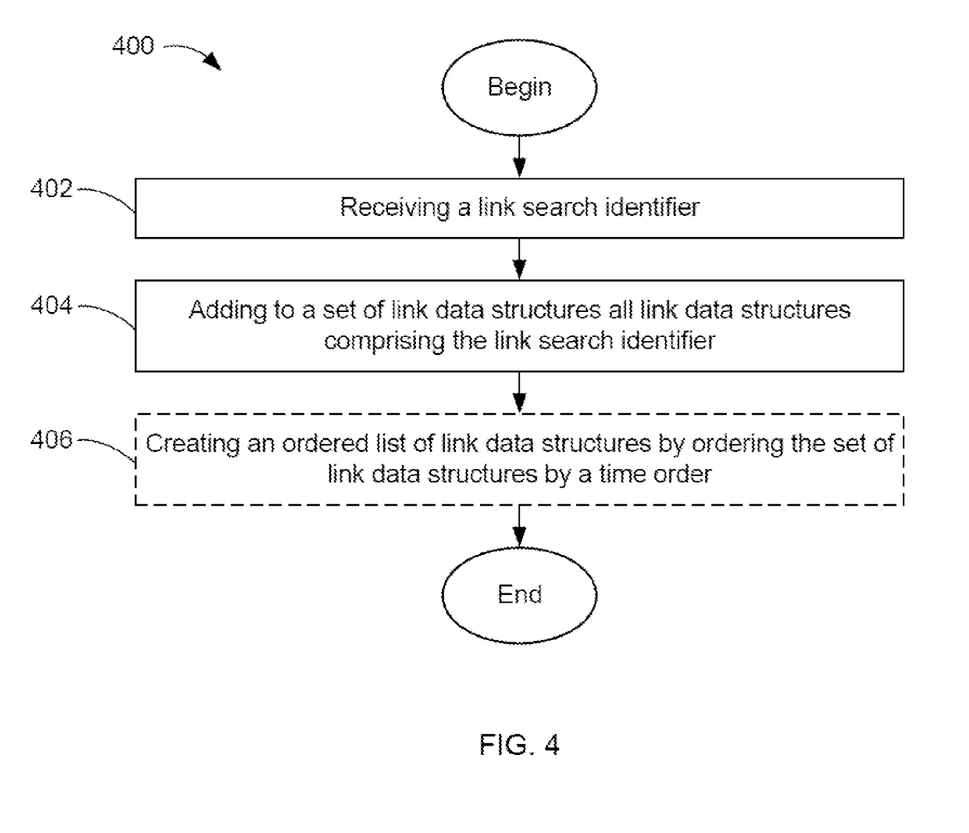
FIG. 4 is a flow chart of yet another method according to an embodiment of the disclosure.

FIG. 4 is a flow chart of a method 400 according to an embodiment of the disclosure. In an embodiment, the method 400 is a method for finding link data structures associated with a link search identifier by a block link server (for example, the block link server 130). At step 402, the block link server 130 receives a link search identifier. In various embodiments, the link search identifier is any of an event identifier, a network element identifier, and network element identifiers of first and second network elements.

In some embodiments, Bloom filters may be used for an initial determination that a link search identifier is either definitely not present in the link data structures of the block link server 130 (no false negative results), or that it might be present (possible false positive results). The Bloom filter is a space-efficient probabilistic data structure, and it also provides constant time complexity for adding items (event identifiers, network element identifiers, or first and second network element identifiers), as well as for asking whether a link search identifier is present.

At step 404, the block link server 130 finds all link data structures that comprise the link search identifier and creates therefrom a set of link data structures. In embodiments where the link search identifier is network element identifiers of first and second network elements, the method 400 finds all link data structures that comprise both the first and second network element identifiers. In some embodiments, in step 404 the block link server 130 further constrains the set of link data structures to include only link data structures that satisfy a time constraint. Such a time constraint might be that a time of creation or a time of modification of the link data structure is before a specified start time or after a specified end time, or between a specified start time and a specified end time. A time criterion in such embodiments may include calendar dates, days of the week, and/or times of day. In some embodiments, at step 406 the block link server 130 creates an ordered list of link data structures by ordering the set of link data structures by a time order.

Searches based on a network element identifier would be beneficial with links created by a fixed position public access WiFi access point network device. Whenever such a network element establishes a network connection for a UE (e.g., a smart phone, tablet, or laptop) the network element might create a link data structure linking its own block relating to the connection to a block created by the UE relating to the connection. Searching the block link server 130 for links that include the network element identifier of the access point network device and the network element identifier of a target UE would allow a contact tracing function to further search the block link server 130 for links that include the access point network element identifier and other UE network element identifiers that connected through the access point network device at the same time that the target network element was connected to the access point network device.

Figure 5:
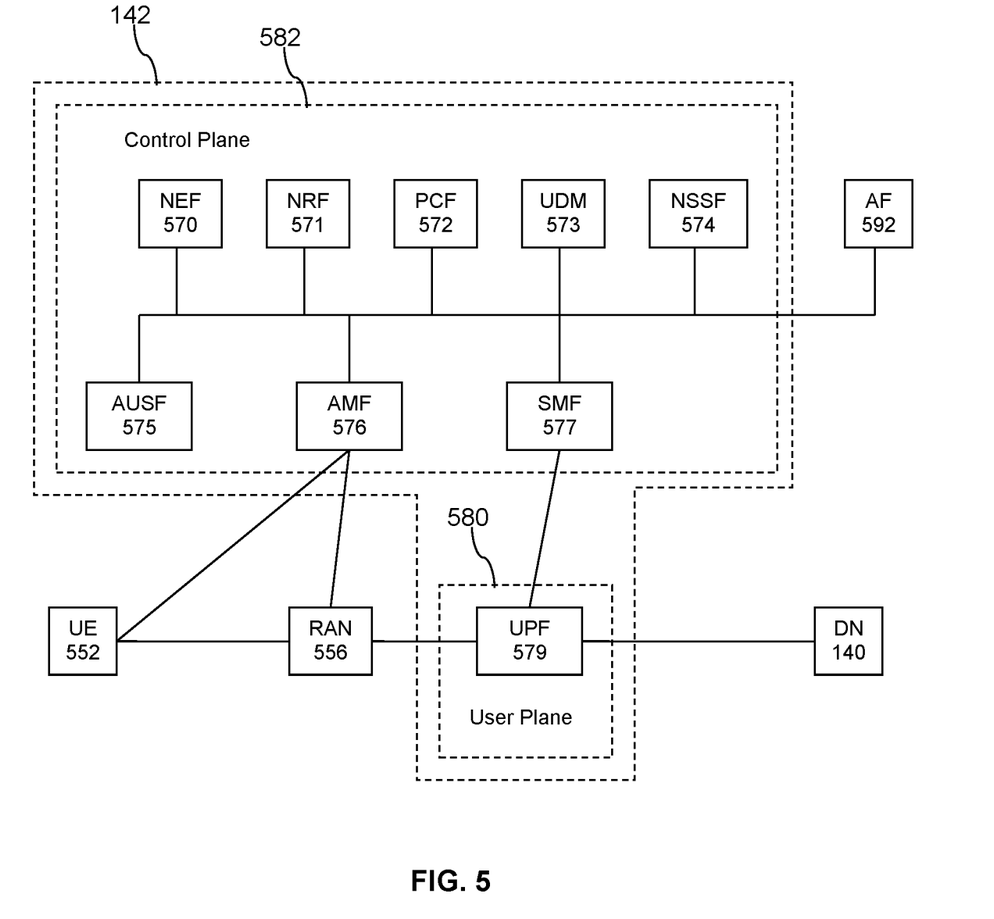
FIG. 5 is a block diagram of a 5G core network according to an embodiment of the disclosure.

Turning now to FIG. 5, further details of the 5G core network 142 are described. 5G core network technology is based on a service-based architecture paradigm. Rather than constructing the 5G core network as a series of special purpose communication nodes (e.g., an HSS node, an MME node, etc.) running on dedicated server computers, the 5G core network is provided as a set of services or network functions. These services or network functions can be executed on virtual servers in a cloud computing environment which supports dynamic scaling and avoidance of long-term capital expenditures (fees for use may substitute for capital expenditures). These network functions can include, for example, a user plane function (UPF) 579, an authentication server function (AUSF) 575, an access and mobility management function (AMF) 576, a session management function (SMF) 577, a network exposure function (NEF) 570, a network repository function (NRF) 571, a policy control function (PCF) 572, a unified data management (UDM) 573, a network slice selection function (NSSF) 574, and other network functions. The network functions may be referred to as virtual network functions (VNFs) in some contexts.

Network functions may be formed by a combination of small pieces of software called microservices. Some microservices can be re-used in composing different network functions, thereby leveraging the utility of such microservices. Network functions may offer services to other network functions by extending application programming interfaces (APIs) to those other network functions that call their services via the APIs. The 5G core network 142 may be segregated into a user plane 580 and a control plane 582, thereby promoting independent scalability, evolution, and flexible deployment.

The UPF 579 delivers packet processing and links the UE 552, via the access network 556, to the network 140 illustrated in FIG. 1. The AMF 576 handles registration and connection management of non-access stratum (NAS) signaling with the UE 552. Said in other words, the AMF 576 manages UE registration and mobility issues. The AMF 576 manages reachability of the UEs 552 as well as various security issues. The SMF 577 handles session management issues. Specifically, the SMF 577 creates, updates, and removes (destroys) protocol data unit (PDU) sessions and manages the session context within the UPF 579. The SMF 577 decouples other control plane functions from user plane functions by performing dynamic host configuration protocol (DHCP) functions and IP address management functions. The AUSF 575 facilitates security processes.

The NEF 570 securely exposes the services and capabilities provided by network functions. The NRF 571 supports service registration by network functions and discovery of network functions by other network functions. The PCF 572 supports policy control decisions and flow-based charging control. The UDM 573 manages network user data and can be paired with a user data repository (UDR) that stores user data such as customer profile information, customer authentication number, and encryption keys for the information. An application function 592, which may be located outside of the 5G core network 142, exposes the application layer for interacting with the 5G core network 142. In an embodiment, the application function 592 may be execute on an application server located geographically proximate to the UE 552 in an "edge computing" deployment mode. The 5G core network 142 can provide a network slice to a subscriber, for example an enterprise customer, that is composed of a plurality of 5G network functions that are configured to provide customized communication service for that subscriber, for example to provide communication service in accordance with communication policies defined by the customer. The NSSF 574 can help the AMF 576 to select the network slice instance (NSI) for use with the UE 552.

Figure 6:
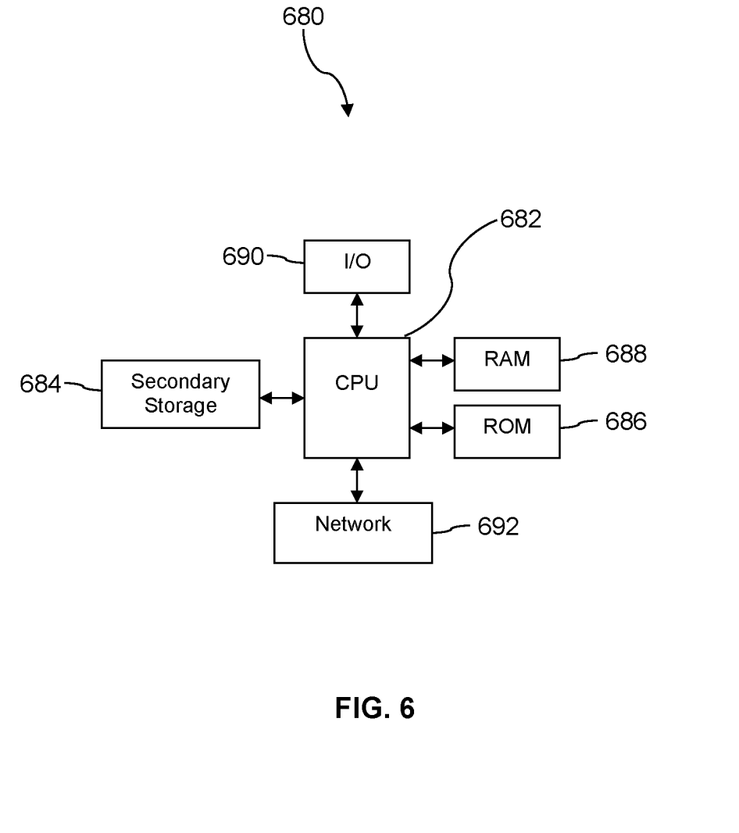
FIG. 6 illustrates a computer system suitable for implementing one or more embodiments disclosed herein.

FIG. 6 illustrates a computer system 680 suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor 682 may be implemented as one or more CPU chips.

It is understood that by programming and/or loading executable instructions onto the computer system 680, at least one of the CPU 682, the RAM 688, and the ROM 686 are changed, transforming the computer system 680 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 680 is turned on or booted, the CPU 682 may execute a computer program or application. For example, the CPU 682 may execute software or firmware stored in the ROM 686 or stored in the RAM 688. In some cases, on boot and/or when the application is initiated, the CPU 682 may copy the application or portions of the application from the secondary storage 684 to the RAM 688 or to memory space within the CPU 682 itself, and the CPU 682 may then execute instructions that the application is comprised of. In some cases, the CPU 682 may copy the application or portions of the application from memory accessed via the network connectivity devices 692 or via the I/O devices 690 to the RAM 688 or to memory space within the CPU 682, and the CPU 682 may then execute instructions that the application is comprised of. During execution, an application may load instructions into the CPU 682, for example load some of the instructions of the application into a cache of the CPU 682. In some contexts, an application that is executed may be said to configure the CPU 682 to do something, e.g., to configure the CPU 682 to perform the function or functions promoted by the subject application. When the CPU 682 is configured in this way by the application, the CPU 682 becomes a specific purpose computer or a specific purpose machine.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage 684. The RAM 688 is used to store volatile data and perhaps to store instructions. Access to both ROM 686 and RAM 688 is typically faster than to secondary storage 684. The secondary storage 684, the RAM 688, and/or the ROM 686 may be referred to in some contexts as computer readable storage media and/or non-transitory computer readable media.

I/O devices 690 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 692 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 692 may provide wired communication links and/or wireless communication links (e.g., a first network connectivity device 692 may provide a wired communication link and a second network connectivity device 692 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), and radio frequency identity (RFID). The radio transceiver cards may promote radio communications using 5G, 5G New Radio, or 5G LTE radio communication protocols. These network connectivity devices 692 may enable the processor 682 to communicate with the Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 682 executes instructions, codes, computer programs, scripts which it accesses from hard disk, floppy disk, optical disk (these various disk-based systems may all be considered secondary storage 684), flash drive, ROM 686, RAM 688, or the network connectivity devices 692. While only one processor 682 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 684, for example, hard drives, floppy disks, optical disks, and/or other device, the ROM 686, and/or the RAM 688 may be referred to in some contexts as non-transitory instructions and/or non-transitory information.

In an embodiment, the computer system 680 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 680 to provide the functionality of a number of servers that is not directly bound to the number of computers in the computer system 680. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read only memory (CD-ROM) disks, floppy disks, jump drives, digital cards, multimedia cards, and others. The computer program product may be suitable for loading, by the computer system 680, at least portions of the contents of the computer program product to the secondary storage 684, to the ROM 686, to the RAM 688, and/or to other non-volatile memory and volatile memory of the computer system 680. The processor 682 may process the executable instructions and/or data structures in part by directly accessing the computer program product, for example by reading from a CD-ROM disk inserted into a disk drive peripheral of the computer system 680. Alternatively, the processor 682 may process the executable instructions and/or data structures by remotely accessing the computer program product, for example by downloading the executable instructions and/or data structures from a remote server through the network connectivity devices 692. The computer program product may comprise instructions that promote the loading and/or copying of data, data structures, files, and/or executable instructions to the secondary storage 684, to the ROM 686, to the RAM 688, and/or to other non-volatile memory and volatile memory of the computer system 680.

In some contexts, the secondary storage 684, the ROM 686, and the RAM 688 may be referred to as a non-transitory computer readable medium or a computer readable storage media. A dynamic RAM embodiment of the RAM 688, likewise, may be referred to as a non-transitory computer readable medium in that while the dynamic RAM receives electrical power and is operated in accordance with its design, for example during a period of time during which the computer system 680 is turned on and operational, the dynamic RAM stores information that is written to it. Similarly, the processor 682 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for creating a link between hyperledger blocks by a block link server, the method comprising:
   receiving by a block link server executing on a computer system a first link creation message from a first network element, the first link creation message comprising first block information that includes a first hyperledger identifier and a first block identifier, both associated with a first hyperledger, wherein the first network element is a public access WiFi access point and the first network element sends the first link creation message to create a link when the first network element establishes a network connection for a User Equipment;
   receiving by the block link server a second link creation message, the second link creation message comprising second block information that includes a second hyperledger identifier and a second block identifier, both associated with a second hyperledger;
   storing by the block link server a link data structure comprising the first block information and the second block information; and
   sending by the block link server a link identifier of the link data structure to the first network element.

2. The method of claim 1, further comprising receiving by the block link server a link information message that includes an event identifier, wherein storing the link data structure includes storing the event identifier.

3. The method of claim 1, wherein the second link creation message is received from the first network element.

4. The method of claim 1, wherein:
   the first block information includes an identifier of the first network element; and
   the second block information includes an identifier of a second network element.

5. The method of claim 1, the method further comprising:
   after storing the link data structure, receiving by the block link server a third link creation message, the third link creation message comprising third block information that includes a third hyperledger identifier and a third block identifier, both associated with a third hyperledger; and
   storing by the block link server in the link data structure the third block information.

6. The method of claim 5, wherein the third link creation message includes the link identifier of the link data structure.

7. The method of claim 1, wherein:
   the second link creation message is received from a second network element; and
   the method further comprises sending by the block link server the link identifier to the second network element.

8. The method of claim 7, the method further comprising:
receiving by the block link server a fourth link creation message from a fourth network element, the fourth link creation message comprising fourth block information that includes a fourth hyperledger identifier and a fourth block identifier, both associated with a fourth hyperledger; and
sending by the block link server the link identifier to the fourth network element,
wherein storing the link data structure comprises storing the fourth block information.

9. A method for creating a link between hyperledger blocks by a first network element, the method comprising:
sending by a network element executing on a computer system a request to a hyperledger server to create a first block;
receiving by the network element first block information from the hyperledger server, the first block information comprising a first hyperledger identifier and a first block identifier of the first block, both associated with a first hyperledger;
requesting by the network element second block information from a second network element, the second block information comprising a second hyperledger identifier and a second block identifier, both associated with a second hyperledger;
sending by the network element a link creation message to a block link server to create a link between hyperledger blocks, the link creation message comprising the first block information and the second block information, wherein the network element is a public access WiFi access point and the network element sends the link creation message to create a link when the network element establishes a network connection for a User Equipment;
receiving by the network element from the block link server a link identifier of a link data structure; and
sending by the network element a request to the hyperledger server to add the link identifier to the first block.

10. The method of claim 9, further comprising:
obtaining by the network element an event identifier, wherein the link creation message includes the event identifier.

11. The method of claim 9, wherein:
the first block information includes an identifier of the first network element; and
the second block information includes an identifier of the second network element.

12. The method of claim 9, further comprising:
obtaining by the network element a second link identifier of a second link data structure;
sending by the network element a link expansion message to the block link server to add the first block to the second link data structure, the link expansion message comprising the first block information and the second link identifier; and
sending by the network element a request to the hyperledger server to add the second link identifier to the first block.

13. The method of claim 12, wherein the network element is executing a network slice function.

14. A system for creating a link between hyperledger blocks, comprising:
a block link server that comprises a non-transitory memory and a processor, wherein the block link server is configured to:
receive a first link creation message from a first network element, the first link creation message that includes first block information comprising a first hyperledger identifier and a first block identifier, both associated with a first hyperledger, wherein the first network element is a public access WiFi access point and the first network element sends the first link creation message to create a link when the first network element establishes a network connection for a User Equipment,
receive a second link creation message, the second link creation message comprising second block information that includes a second hyperledger identifier and a second block identifier, both associated with a second hyperledger,
store a link data structure comprising the first block information and the second block information, and
send a link identifier of the link data structure to the first network element.

15. The system of claim 14, wherein the link identifier links hyperledger blocks from different hyperledgers.

16. The system of claim 14, wherein the block link server is further configured to:
after storing the link data structure, receive a third link creation message, the third link creation message comprising third block information that includes the link identifier of the link data structure, a third hyperledger identifier, and a third block identifier, wherein the third hyperledger identifier and the third block identifier are associated with a third hyperledger, and
store the third block information in the link data structure.

17. The system of claim 14, wherein the block link server is further configured to:
receive a link information message comprising an event identifier, wherein storing the link data structure includes storing the event identifier.

18. The system of claim 14, wherein the second link creation message is received from a second network element identifier, and wherein the block link server is further configured to send the link identifier to the second network element.

19. The system of claim 14, wherein the block link server is further configured to:
receive a fourth link creation message from a fourth network element, the fourth link creation message comprising fourth block information that includes a fourth hyperledger identifier and a fourth block identifier, both associated with a fourth hyperledger, and
sends the link identifier to the fourth network element, and
wherein the fourth block information is stored in the link data structure.

* * * * *